United States Patent
Ano

(10) Patent No.: US 9,733,728 B2
(45) Date of Patent: Aug. 15, 2017

(54) POSITION DETECTING DEVICE AND POSITION DETECTING METHOD

(71) Applicant: SEIKO EPSON CORPORATION, Tokyo (JP)

(72) Inventor: Takahiro Ano, Beppu (JP)

(73) Assignee: SEIKO EPSON CORPORATION, Tokyo (JP)

( * ) Notice: Subject to any disclaimer, the term of this patent is extended or adjusted under 35 U.S.C. 154(b) by 158 days.

(21) Appl. No.: 14/630,094

(22) Filed: Feb. 24, 2015

(65) Prior Publication Data

US 2015/0248174 A1 Sep. 3, 2015

(30) Foreign Application Priority Data

Mar. 3, 2014 (JP) .................. 2014-040898
Mar. 3, 2014 (JP) .................. 2014-040899

(51) Int. Cl.
*G09G 5/00* (2006.01)
*G06F 3/03* (2006.01)
*G06F 3/041* (2006.01)
*G06F 3/042* (2006.01)
*G06F 3/0354* (2013.01)

(52) U.S. Cl.
CPC ........ *G06F 3/0325* (2013.01); *G06F 3/03545* (2013.01); *G06F 3/042* (2013.01); *G06F 3/0418* (2013.01); *G06F 3/0425* (2013.01)

(58) Field of Classification Search
CPC .... G06F 3/0325; G06F 3/0416; G06F 3/0425; G06F 3/03545
USPC ....................................................... 345/158
See application file for complete search history.

(56) References Cited

U.S. PATENT DOCUMENTS

| 5,973,672 A * | 10/1999 | Rice ...................... G06F 3/0386 345/157 |
| 6,512,507 B1 * | 1/2003 | Furihata .............. G06F 3/04892 345/157 |
| 8,589,824 B2 * | 11/2013 | Hillis ...................... G06F 3/017 382/103 |
| 9,377,874 B2 * | 6/2016 | Aull ........................ G06F 3/017 |
| 2001/0028341 A1 * | 10/2001 | Kitazawa .............. G06F 3/0425 345/156 |

(Continued)

FOREIGN PATENT DOCUMENTS

EP 2 120 455 A1 11/2009
JP 2007-207056 A 8/2007

(Continued)

OTHER PUBLICATIONS

Jul. 24, 2015 Search Report issued in Europen Patent Application No. 15156957.1.

*Primary Examiner* — Benyam Ketema
(74) *Attorney, Agent, or Firm* — Oliff PLC

(57) ABSTRACT

A projector includes: a pointer detecting unit that determines a type of each pointer; a coordinate calculating unit that calculates a pointed position of the pointer; a storage unit that stores a reference variation amount of the pointed position by the pointer for each of the pointers; and a projection control unit that acquires, from the storage unit, the reference variation amount according to the type of the pointer determined by the pointer detecting unit, and corrects, based on the acquired reference variation amount, the pointed position detected by the coordinate calculating unit.

11 Claims, 9 Drawing Sheets

(56) References Cited

U.S. PATENT DOCUMENTS

| | | | |
|---|---|---|---|
| 2006/0007134 A1* | 1/2006 | Ting | G06F 3/0386 345/156 |
| 2009/0262098 A1* | 10/2009 | Yamada | G06F 1/1616 345/175 |
| 2011/0069022 A1* | 3/2011 | Yokota | G06F 3/0416 345/173 |
| 2012/0162603 A1* | 6/2012 | Dejima | A61B 3/113 351/209 |
| 2012/0249422 A1* | 10/2012 | Tse | G06F 3/0304 345/158 |
| 2013/0100022 A1* | 4/2013 | Thompson | G06F 3/033 345/163 |
| 2014/0313165 A1 | 10/2014 | Lam et al. | |
| 2014/0313166 A1* | 10/2014 | Rattray | H04N 9/3179 345/175 |
| 2014/0362052 A1 | 12/2014 | McCaughan et al. | |
| 2015/0331536 A1* | 11/2015 | Miyakawa | G06F 3/0416 345/173 |

FOREIGN PATENT DOCUMENTS

| | | |
|---|---|---|
| JP | 2011227600 A | 11/2011 |
| WO | 2013/104061 A1 | 7/2013 |
| WO | 2013/108032 A1 | 7/2013 |

\* cited by examiner

POSITION DETECTING DEVICE AND POSITION DETECTING METHOD

The entire disclosure of Japanese Patent Application Nos.2014-040898, filed Mar. 3, 2014 and 2014-040899, filed Mar. 3, 2014 are expressly incorporated by reference herein.

BACKGROUND

1. Technical Field

The present invention relates to a position detecting device and a position detecting method.

2. Related Art

A system has been proposed, in which an image that is output from a video output device such as a computer is projected onto a projection surface by a projector, an image of the projected image is captured by a camera, and an operation instruction performed on the projected image is recognized by the projector. For example, JP-A-2011-227600 discloses a technique for specifying a pointed position by a light emitting pen as a pointer by capturing an image of light emission of the light emitting pen by an imaging device.

When the pointed position of the pointer is specified using the captured image captured by the imaging device, a variation (fluctuation) may occur in the pointed position to be specified, and therefore, it is necessary to perform a correcting process for correcting the variation in the pointed position. Especially when a plurality of pointers having different methods for detecting a pointed position are used in combination with each other, the difference in the detection method may serve as a factor to exert an influence on the accuracy of position detection. Moreover, the variation amount may vary depending on the pointed position pointed to on the projection surface, which may exert an influence on the accuracy of position detection.

SUMMARY

An advantage of some aspects of the invention is to provide a position detecting device that can properly correct a pointed position irrespective of a pointer used or the pointed position, and a position detecting method.

An aspect of the invention is directed to a position detecting device including: a determining unit that determines a type of each pointer; a detecting unit that detects a pointed position of the pointer; a storage unit that stores a reference variation amount regarding a variation in the pointed position detected by the detecting unit for each of the pointers; and a correcting unit that acquires, from the storage unit, the reference variation amount according to the type of the pointer determined by the determining unit, and corrects, based on the acquired reference variation amount, the pointed position detected by the detecting unit.

According to the configuration, the correction of the pointed position can be properly performed irrespective of the pointer used.

Another aspect of the invention is directed to the position detecting device according to the aspect of the invention described above, wherein, when a variation in the pointed position falls within a range of the reference variation amount, the correcting unit performs a correction for compensating the variation.

According to the configuration, the variation in the pointed position can be compensated.

Still another aspect of the invention is directed to the position detecting device according to the aspect of the invention described above, wherein the position detecting device further includes a calculating unit that calculates the reference variation amount based on a variation in the pointed position detected by the detecting unit, and the storage unit stores the reference variation amount calculated by the calculating unit.

According to the configuration, it is possible to calculate the reference variation amount based on the variation in the pointed position detected by the detecting unit and cause the storage unit to store the calculated reference variation amount.

Still another aspect of the invention is directed to the position detecting device according to the aspect of the invention described above, wherein the position detecting device further includes: a light emission unit that emits detection light to a detection region in which the pointed position of the pointer is detected; and an imaging unit that captures an image of the detection region, and the detecting unit detects, from captured image data of the imaging unit, at least one of an image of light emitted by a first pointer as the pointer and an image of the detection light reflected by a second pointer as the pointer, and detects, based on light emitting timings of the first pointer and the light emission unit, the pointed position while distinguishing between the first pointer and the second pointer.

According to the configuration, the accuracy of distinguishing between the first pointer and the second pointer can be improved, so that the correction of the pointed position of each of the pointers can be properly performed irrespective of the pointer used.

Yet another aspect of the invention is directed to the position detecting device according to the aspect of the invention described above, wherein the detecting unit detects, as the pointed position of the first pointer, a position of a bright spot appearing in captured image data obtained when the light emission unit is turned off.

According to the configuration, the accuracy of distinguishing between the first pointer and the second pointer can be improved, so that the correction of the pointed position of each of the pointers can be properly performed irrespective of the pointer used.

Still yet another aspect of the invention is directed to the position detecting device according to the aspect of the invention described above, wherein when correcting the pointed position, the correcting unit uses the reference variation amount different according to the pointed position.

According to the configuration, the correction of the pointed position can be performed using the reference variation amount according to the pointed position. Accordingly, the accuracy of position detection can be improved irrespective of the pointed position.

Further another aspect of the invention is directed to the position detecting device according to the aspect of the invention described above, wherein the storage unit stores a plurality of reference variation amounts according to pointed positions, and the correcting unit acquires, from the storage unit, the reference variation amount according to the pointed position detected by the detecting unit, and corrects, based on the acquired reference variation amount, the pointed position detected by the detecting unit.

According to the configuration, the pointed position can be corrected using the reference variation amount that is proper for each of the pointed positions.

Still further another aspect of the invention is directed to the position detecting device according to the aspect of the invention described above, wherein the correcting unit adjusts the reference variation amount stored in the storage unit according to the pointed position, and corrects, based on the adjusted reference variation amount, the pointed position detected by the detecting unit.

According to the configuration, the correction accuracy of the pointed position can be increased.

Yet further another aspect of the invention is directed to the position detecting device according to the aspect of the invention described above, wherein the position detecting device further includes a calculating unit that divides a detection region in which the pointed position of the pointer is detected into a plurality of regions, and calculates the reference variation amount based on a variation in the pointed position detected by the detecting unit for each of the divided regions, the storage unit stores the reference variation amount calculated by the calculating unit, and the correcting unit corrects the pointed position based on the reference variation amount of a region including the pointed position detected by the detecting unit in the plurality of regions.

According to the configuration, since the reference variation amount is calculated for each of the plurality of regions, the accuracy of position detection can be improved.

Still yet further another aspect of the invention is directed to the position detecting device according to the aspect of the invention described above, wherein the calculating unit calculates, for some of the divided regions, the reference variation amount based on a variation in the pointed position detected by the detecting unit, and calculates, for the other regions, the reference variation amount by an arithmetic process using the reference variation amounts of the some regions.

According to the configuration, the number of regions for which the reference variation amount is to be calculated can be reduced to thereby shorten the time for calculating the reference variation amount.

A further aspect of the invention is directed to a position detecting method including: determining a type of each pointer; detecting a pointed position of the pointer; and acquiring, from a storage unit that stores a reference variation amount regarding a variation in the detected pointed position for each of the pointers, the reference variation amount according to the determined type of the pointer, and correcting the detected pointed position based on the acquired reference variation amount.

According to the configuration, the correction of the pointed position can be properly performed irrespective of the pointer used.

According to the aspects of the invention, the correction of a pointed position can be properly performed irrespective of a pointer used.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the drawings.

Figure 1:
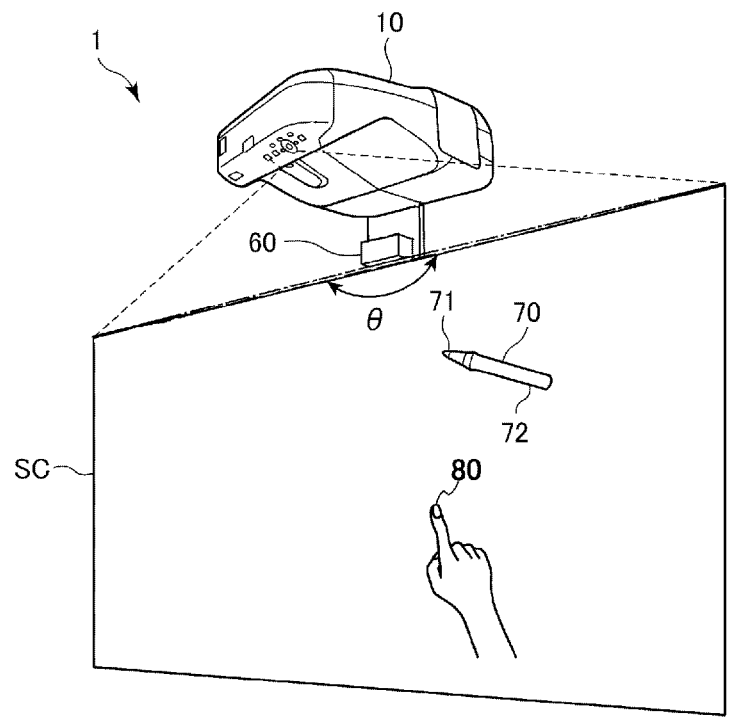
FIG. 1 is a schematic configuration diagram of a projection system according to an embodiment.

FIG. 1 is a diagram showing the configuration of a projection system 1 according to the embodiment to which the invention is applied. The projection system 1 includes a projector 10 placed above a screen SC (projection surface) and a light emission device 60 (light emission unit) placed at the upper portion of the screen SC.

The projector 10 is placed just above or obliquely above the screen SC, and projects an image onto the screen SC located obliquely below the projector. The screen SC exemplified in the embodiment is a plate or curtain fixed to a wall surface or erected on a floor surface. The invention is not limited to this example, and a wall surface can be used as the screen SC. In this case, the projector 10 and the light emission device 60 may be attached to the upper portion of the wall surface used as the screen SC.

The projector 10 is connected to an external image supply device such as a PC (personal computer), a video playback device, or a DVD (Digital Versatile Disk) playback device. The projector 10 projects an image onto the screen SC based on an analog image signal or digital image data supplied from the image supply device. The projector 10 may be configured to read image data stored in a built-in storage unit 110 (FIG. 2) or an externally connected storage medium and display an image on the screen SC based on the image data.

The light emission device 60 includes a light source unit 61 (FIG. 2) formed of a solid-state light source, and diffuses and emits (radiates) light emitted by the light source unit 61 along the screen SC. The emission range of the light emission device 60 is indicated by an angle θ in FIG. 1. The light emission device 60 is placed above the upper edge of the screen SC, and emits light downward in a range of the angle θ. The light emitted by the light emission device 60 forms a layer of light along the screen SC. In the embodiment, the angle θ reaches substantially 180 degrees, and the layer of light is formed over substantially the entire screen SC. It is preferable that the surface of the screen SC and the layer of light are close to each other. In the embodiment, a distance between the surface of the screen SC and the layer of light falls within a range of about 10 mm to 1 mm. The light emitted by the light emission device 60 is light other than that in the visible region, and is infrared light in the embodiment.

When a pointing operation is performed on the screen SC, the projection system 1 detects the pointed position with the projector 10.

As a pointer used for the pointing operation, a pen-type pointer 70 (first pointer) or a pointer 80 (second pointer) such as a user's finger can be used. An operation switch 75

(FIG. 2) that operates when pressed is built into a tip portion 71 of the pointer 70. Therefore, when an operation of pressing the tip portion 71 against a wall or the screen SC is performed, the operation switch 75 is turned on. The pointer 70 is operated by the user with a rod-like shaft 72 in his/her hand so as to cause the tip portion 71 to touch the screen SC, and an operation of pressing the tip portion 71 against the screen SC is also performed. The tip portion 71 includes a transmitting and receiving unit 74 (FIG. 2) that emits light. The projector 10 detects, based on the light emitted by the pointer 70, the position of the tip portion 71 as a pointed position. The light emitted by the pointer 70 is light other than that in the visible region, and is infrared light in the embodiment.

When a position pointing operation is performed with the pointer 80 as the user's finger, the user touches the screen SC with his/her finger. In this case, the position at which the pointer 80 touches the screen SC is detected.

That is, when the tip (for example, the fingertip) of the pointer 80 touches the screen SC, the layer of light formed by the light emission device 60 is blocked. At this time, the light emitted by the light emission device 60 shines on the pointer 80 and is reflected, and a portion of the reflected light travels from the pointer 80 toward the projector 10. Since the projector 10 has a function of detecting light from the screen SC side, that is, light from below with a position detecting unit 50 described later, the reflected light of the pointer 80 can be detected. The projector 10 detects the reflected light that is reflected by the pointer 80, whereby the pointing operation performed by the pointer 80 on the screen SC is detected. Moreover, the projector 10 detects the pointed position pointed to by the pointer 80.

Since the layer of light emitted by the light emission device 60 is close to the screen SC, the position of the pointer 80 at which the light is reflected can be deemed as the tip that is closest to the screen SC, or the pointed position. For this reason, the pointed position can be specified based on the reflected light of the pointer 80.

The projection system 1 functions as an interactive whiteboard system, and detects an operation instruction performed by the user with the pointer 70 or 80 to reflect the pointed position on a projected image. Specifically, the projection system 1 performs a process of drawing a figure or arranging a character or symbol at the pointed position, a process of drawing a figure along the trajectory of the pointed position, a process of erasing the drawn figure or the arranged character or symbol, or the like. Moreover, it is possible to store, as image data, the drawn figure or the arranged character or symbol on the screen SC, and it is also possible to output the drawn figure or the arranged character or symbol to an external device.

Further, the projection system 1 may operate as a pointing device by detecting the pointed position, and output coordinates of the pointed position in a projection region of the screen SC onto which the projector 10 projects an image. Moreover, the projection system. 1 can perform a GUI (Graphical User Interface) operation using the coordinates of the pointed position.

Figure 2:
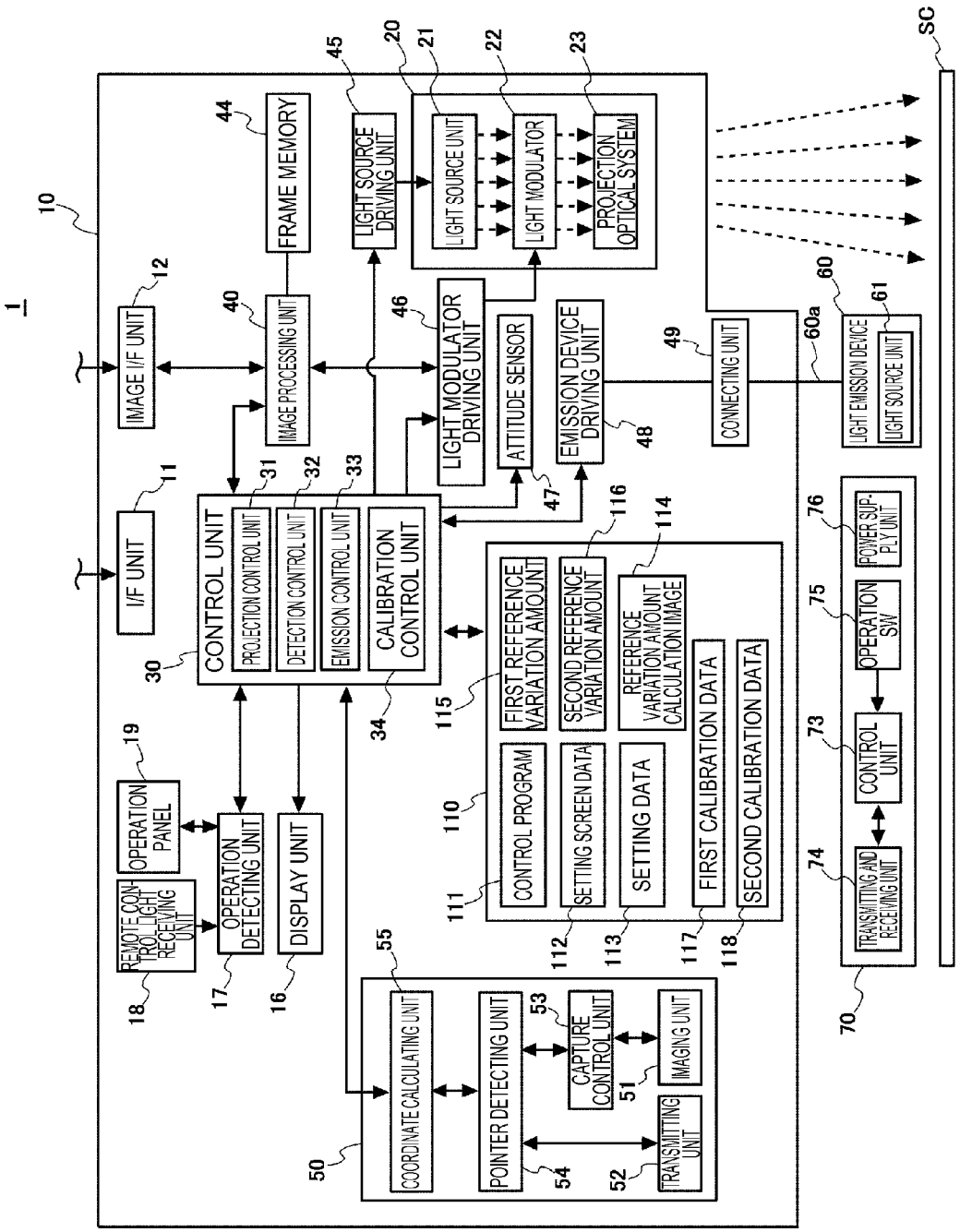
FIG. 2 is a functional block diagram of the projection system.

FIG. 2 is a functional block diagram of parts constituting the projection system 1.

The projector 10 includes, as interfaces connected to an external device, an I/F (interface) unit 11 and an image I/F (interface) unit 12. Each of the I/F unit 11 and the image I/F unit 12 may include a connector for wired connection, and include an interface circuit corresponding to the connector. Moreover, each of the I/F unit 11 and the image I/F unit 12 may include a wireless communication interface. Examples of the connector for wired connection and the interface circuit include those conforming to a wired LAN, IEEE 1394, a USB, or the like. Examples of the wireless communication interface include those conforming to a wireless LAN, Bluetooth (registered trademark), or the like. For the image I/F unit 12, an interface for image data, such as an HDMI (registered trademark) interface, can also be used. The image I/F unit 12 may include an interface to which audio data is input.

The I/F unit 11 is an interface to transmit and receive various types of data relative to an external device such as a PC. The I/F unit 11 receives and outputs control data regarding image projection, setting data for setting the operation of the projector 10, the coordinate data of the pointed position detected by the projector 10, or the like. A control unit 30 described later has a function of transmitting and receiving data relative to the external device via the I/F unit 11.

The image I/F unit 12 is an interface to which digital image data is input. The projector 10 of the embodiment projects an image based on the digital image data that is input via the image I/F unit 12. The projector 10 may include a function of projecting an image based on an analog image signal. In this case, the image I/F unit 12 may include an interface for analog image and an A/D conversion circuit that converts an analog image signal into digital image data.

The projector 10 includes a projecting unit 20 that performs formation of an optical image. The projecting unit 20 includes a light source unit 21, a light modulator 22, and a projection optical system 23. The light source unit 21 includes a light source formed of a xenon lamp, an extra-high-pressure mercury lamp, an LED (Light Emitting Diode), a laser light source, or the like. The light source unit 21 may include a reflector and an auxiliary reflector that guide light emitted by the light source to the light modulator 22. Further, the light source unit 21 may include a lens group (not shown) for enhancing the optical characteristics of projected light, a polarizer, or a dimming element that reduces the intensity of light emitted by the light source on the path to the light modulator 22.

The light modulator 22 includes three transmissive liquid crystal panels corresponding to, for example, three primary colors of RGB, and modulates light passing through the liquid crystal panels to generate image light. The light from the light source unit 21 is separated into colored lights of three colors of RGB, and the respective colored lights are incident on the corresponding liquid crystal panels. The colored lights modulated by passing through the respective liquid crystal panels are combined by a combining optical system such as a cross dichroic prism, and emitted to the projection optical system 23.

The projection optical system 23 includes a lens group that guides the image light modulated by the light modulator 22 toward the direction of the screen SC to form an image on the screen SC. The projection optical system 23 may include a zoom mechanism to perform scaling and focus adjustment of a projected image on the screen SC, and a focus adjusting mechanism to perform adjustment of focus. When the projector 10 is of a short focus type, the projection optical system 23 may include a concave mirror that reflects image light toward the screen SC.

A light source driving unit 45 that turns on the light source unit 21 under the control of the control unit 30 and a light modulator driving unit 46 that operates the light modulator 22 under the control of the control unit 30 are connected to the projecting unit 20. The light source driving unit 45 switches on or off the light source unit 21, and may have a function of adjusting the light intensity of the light source unit 21.

The projector 10 includes an image processing system to process an image projected by the projecting unit 20. The image processing system includes the control unit 30 that controls the projector 10, the storage unit 110, an operation detecting unit 17, an image processing unit 40, the light source driving unit 45, and the light modulator driving unit 46. A frame memory 44 is connected to the image processing unit 40, and an attitude sensor 47, an emission device driving unit 48, and the position detecting unit 50 are connected to the control unit 30. These parts may be included in the image processing system.

The control unit 30 executes a predetermined control program 111 to thereby control each part of the projector 10. The storage unit 110 stores the control program 111 executed by the control unit 30 and data processed by the control unit 30 in a non-volatile manner. The storage unit 110 stores setting screen data 112 of a screen for setting the operation of the projector 10, and setting data 113 indicating the contents that are set using the setting screen data 112.

Moreover, a reference variation amount calculation image 114, first reference variation amounts 115, second reference variation amounts 116, first calibration data 117, second calibration data 118, and the like are stored in the storage unit 110. These data will be described later.

Under the control of the control unit 30, the image processing unit 40 processes image data that is input via the image I/F unit 12, and outputs an image signal to the light modulator driving unit 46. The process executed by the image processing unit 40 includes a process for determining whether an image is a 3D (three-dimensional) image or a 2D (two-dimensional) image, a resolution converting process, a frame-rate converting process, a distortion correcting process, a digital zoom process, a color-tone correcting process, and a luminance correcting process. The image processing unit 40 executes the process designated by the control unit 30, and performs as necessary the process using parameters that are input from the control unit 30. Moreover, it is of course possible to execute a plurality of the processes described above in combination with each other.

The image processing unit 40 is connected to the frame memory 44. The image processing unit 40 expands image data that is input from the image I/F unit 12 to the frame memory 44, and executes the various types of processes on the expanded image data. The image processing unit 40 reads the processed image data from the frame memory 44, generates R, G, and B image signals corresponding to the image data, and outputs the signals to the light modulator driving unit 46.

The light modulator driving unit 46 is connected to the liquid crystal panels of the light modulator 22. The light modulator driving unit 46 drives the liquid crystal panels based on the image signals that are input from the image processing unit 40, and draws an image on each of the liquid crystal panels.

The operation detecting unit 17 is connected to a remote control light receiving unit 18 and an operation panel 19 that function as input devices, and detects an operation performed via the remote control light receiving unit 18 and the operation panel 19.

The remote control light receiving unit 18 receives an infrared ray signal that is transmitted corresponding to a button operation by a remote control (not shown) used by the user of the projector 10. The remote control light receiving unit 18 decodes the infrared ray signal received from the remote control, generates operation data indicating the operation content at the remote control, and outputs the operation data to the control unit 30.

The operation panel 19 is provided on an external housing of the projector 10, and includes various types of switches and indicator lights. Under the control of the control unit 30, the operation detecting unit 17 appropriately turns on and off the indicator lights of the operation panel 19 according to the operating state or setting state of the projector 10. When any of the switches of the operation panel 19 is operated, operation data corresponding to the operated switch is output from the operation detecting unit 17 to the control unit 30.

A display unit 16 displays information under the control of the control unit 30. For example, a selection screen for selecting the pointer 70 or 80 for which a reference variation amount is to be calculated is displayed on the display unit 16.

The emission device driving unit 48 is connected to the light emission device 60 via a connecting unit 49. The connecting unit 49 is, for example, a connector having a plurality of pins. The light emission device 60 is connected to the connecting unit 49 via a cable 60a. The emission device driving unit 48 generates a pulse signal under the control of the control unit 30, and outputs the pulse signal to the light emission device 60 via the connecting unit 49. Moreover, the emission device driving unit 48 supplies power to the light emission device 60 via the connecting unit 49.

The light emission device 60 is composed of the light source unit 61 and an optical component that are accommodated in a substantially box-shaped case as shown in FIG. 1. The light emission device 60 of the embodiment includes, in the light source unit 61, the solid-state light source (not shown) that emits infrared light. The infrared light emitted by the solid-state light source is diffused by a collimating lens and a Powell lens, and forms a plane along the screen SC. The light source unit 61 may include a plurality of solid-state light sources, and form a layer of light so as to cover the image projection range of the screen SC by diffusing the respective lights emitted by the plurality of solid-state light sources. Moreover, the light emission device 60 may include an adjusting mechanism to adjust the distance or angle between the layer of light emitted by the light source unit 61 and the screen SC.

The light emission device 60 turns on the light source unit 61 with the pulse signal and power supplied from the emission device driving unit 48. The timing at which the light source unit 61 is turned on or off is controlled by the emission device driving unit 48. The control unit 30 controls the emission device driving unit 48 to turn on the light source unit 61 in synchronization with the timing at which an imaging unit 51 described later captures an image.

The position detecting unit 50 detects an operation performed with the pointer 70 or 80 on the screen SC. The position detecting unit 50 is configured to include the imaging unit 51, a transmitting unit 52, a capture control unit 53, a pointer detecting unit 54, and a coordinate calculating unit 55.

The imaging unit 51 includes an imaging optical system, an imaging element, and an interface circuit, and captures an image in the projection direction of the projection optical system 23. The imaging optical system of the imaging unit 51 is arranged to face substantially in the same direction as the projection optical system 23, and has an angle of view covering the range in which the projection optical system 23 projects an image onto the screen SC. Examples of the imaging element include a CCD or CMOS that receives light in the infrared region and the visible light region. The imaging unit 51 may include a filter that blocks a portion of light incident on the imaging element. For example, when the imaging unit 51 receives infrared light, a filter that mainly transmits light in the infrared region may be arranged in front of the imaging element. The interface circuit of the imaging unit 51 reads a detected value of the imaging element and outputs the value.

The capture control unit 53 causes the imaging unit 51 to capture an image, and generates captured image data. When the imaging element captures an image with the visible light, an image projected onto the screen SC is captured. Moreover, the capture control unit 53 can cause the imaging unit 51 to capture an image of infrared light. In the captured image in this case, infrared light (infrared ray signal) emitted by the pointer 70 or reflected light reflected by the pointer 80 appears.

The pointer detecting unit 54 detects the pointed position of the pointer 70 or 80 based on the captured image data that the capture control unit 53 causes the imaging unit 51 to capture. The pointer detecting unit 54 detects, from the captured image data obtained when the capture control unit 53 causes the imaging unit 51 to capture an image of infrared light, at least one of an image of infrared light emitted by the pointer 70 and an image of reflected light reflected by the pointer 80. Further, the pointer detecting unit 54 determines whether the detected image is the image of light emitted by the pointer 70 or the image of reflected light of the pointer 80. That is, the pointer detecting unit 54 determines whether the operation instruction is performed by the pointer 70 or the pointer 80. A method for determining the pointer 70 or 80, which is performed by the pointer detecting unit 54, will be described later. The pointer detecting unit 54 generates type information indicating whether the detected image is the image of the pointer 70 or the image of reflected light of the pointer 80, and sends the type information to the coordinate calculating unit 55. Moreover, the pointer detecting unit 54 determines, from the captured image data, the operating state of the operation switch 75 included in the pointer 70. The pointer 70 switches a lighting pattern of the pointer 70 according to the operating state of the operation switch 75 included in the pointer 70. The pointer detecting unit 54 determines the lighting pattern of the pointer 70 based on a plurality of pieces of captured image data, and determines the operating state of the operation switch 75. The pointer detecting unit 54 sends data indicating the determined operating state to the coordinate calculating unit 55.

The coordinate calculating unit 55 calculates, based on the position of the image detected by the pointer detecting unit 54, coordinate values of the pointed position of the pointer 70 or 80 in the captured image data, and outputs the coordinate values to the control unit 30. The coordinate calculating unit 55 may calculate coordinate values of the pointed position of the pointer 70 or 80 in the projected image projected by the projecting unit 20, and output the coordinate values to the control unit 30. Further, the coordinate calculating unit 55 may calculate coordinates of the pointed position of the pointer 70 or 80 in image data drawn in the frame memory 44 by the image processing unit 40, or coordinates of the pointed position of the pointer 70 or 80 in input image data of the image I/F unit 12. The coordinate calculating unit 55 outputs, together with the calculated coordinate values of the pointed position, the type information received from the pointer detecting unit 54 to the control unit 30. Moreover, when the coordinate calculating unit 55 receives the data indicating the operating state of the operation switch 75 from the pointer detecting unit 54, the coordinate calculating unit 55 outputs the data indicating the operating state to the control unit 30.

The transmitting unit 52 transmits an infrared ray signal to the pointer 70 under the control of the pointer detecting unit 54. The transmitting unit 52 includes a light source such as an infrared LED, and turns on and off the light source under the control of the pointer detecting unit 54.

The pointer 70 includes a control unit 73, a transmitting and receiving unit 74, the operation switch 75, and a power supply unit 76. These parts are accommodated in the shaft 72 (FIG. 1). The control unit 73 is connected to the transmitting and receiving unit 74 and the operation switch 75, and detects the state (on or off) of the operation switch 75. The transmitting and receiving unit 74 includes a light source such as an infrared LED and a light receiving element that receives infrared light, turns on and off the light source under the control of the control unit 73, and outputs a signal indicating the light receiving state of the light receiving element to the control unit 73.

The power supply unit 76 includes a dry battery or secondary battery as a power supply, and supplies power to each of the control unit 73, the transmitting and receiving unit 74, and the operation switch 75.

The pointer 70 may include a power switch to switch on or off the supply of power from the power supply unit 76.

Here, a method for specifying the pointer 70 from the captured image data of the imaging unit 51 through mutual communication between the position detecting unit 50 and the pointer 70 will be described.

When the position pointing operation performed by the pointer 70 is detected, the control unit 30 controls the pointer detecting unit 54 to transmit a synchronizing signal from the transmitting unit 52. That is, under the control of the control unit 30, the pointer detecting unit 54 causes the light source of the transmitting unit 52 to be turned on in a predetermined period. The infrared light that is periodically emitted by the transmitting unit 52 functions as a synchronizing signal for synchronizing the position detecting unit 50 with the pointer 70.

On the other hand, after the power supply from the power supply unit 76 is started and a predetermined initialization operation is performed, the control unit 73 receives the infrared light emitted by the transmitting unit 52 of the projector 10 with the transmitting and receiving unit 74. When the control unit 73 receives the infrared light that is periodically emitted by the transmitting unit 52 with the transmitting and receiving unit 74, the control unit 73 causes the light source of the transmitting and receiving unit 74 to be turned on (emit light) in a previously set lighting pattern and in synchronization with the timing of the infrared light. The lighting pattern represents data that is peculiar to the pointer 70 and in which turning on and off of the light source correspond to on and off of the data. The control unit 73 causes the light source to be turned on and off according to a turn-on time and a turn-off time of the set pattern. The control unit 73 repeatedly executes the pattern while power is supplied from the power supply unit 76.

That is, the position detecting unit 50 periodically transmits a synchronizing infrared ray signal to the pointer 70, and the pointer 70 transmits a previously set infrared ray signal in synchronization with the infrared ray signal transmitted by the position detecting unit 50.

The capture control unit 53 of the position detecting unit 50 performs control to synchronize the capture timing of the imaging unit 51 with the lighting timing of the pointer 70.

The capture timing is determined based on the lighting timing of the transmitting unit 52 that is caused by the pointer detecting unit 54. The pointer detecting unit 54 can specify the lighting pattern of the pointer 70 depending on whether or not the image of light of the pointer 70 appears in the captured image data of the imaging unit 51.

The lighting pattern of the pointer 70 can be a pattern that is peculiar to each individual one of the pointers 70 or a pattern including a pattern that is common to the plurality of pointers 70 and a pattern that is peculiar to each individual one of the pointers 70. In this case, when images of infrared lights emitted by the plurality of pointers 70 are included in captured image data, the pointer detecting unit 54 can identify the respective images as the images of the different pointers 70.

Moreover, the control unit 30 controls the emission device driving unit 48 to synchronize the lighting timing of the light source unit 61 with the capture timing of the imaging unit 51. In the case where the light source unit 61 is turned on in a pulsed manner in synchronization with the capture timing of the imaging unit 51, when the pointer 80 points to a position on the screen SC, the reflected light of the pointer 80 appears in the captured image of the imaging unit 51. When the light source unit 61 is turned on in a pattern which can be distinguished from the lighting timing of the pointer 70, the pointer detecting unit 54 can determine whether the image appearing in the captured image data is the pointer 70 or the pointer 80. The lighting timing of the light source unit 61 will be described later with reference to FIG. 3.

Further, the control unit 73 included in the pointer 70 switches the lighting patterns of the transmitting and receiving unit 74 according to the operating state of the operation switch 75. For this reason, the pointer detecting unit 54 can determine, based on a plurality of pieces of captured image data, the operating state of the pointer 70, that is, whether or not the tip portion 71 is pressed against the screen SC. The pointer detecting unit 54 outputs data indicating the operating state of the operation switch 75 to the control unit 30 via the coordinate calculating unit 55.

The attitude sensor 47 is composed of an acceleration sensor, a gyro sensor, or the like, and outputs a detected value to the control unit 30. The attitude sensor 47 is fixed to the main body of the projector 10 so as to be capable of identifying the placement direction of the projector 10.

The projector 10 can be used in, in addition to the hanging placement where the projector 10 hangs from a wall surface or ceiling surface as shown in FIG. 1, a placement state where projection is performed from below the screen SC, a placement state where a horizontal plane such as a desk top surface is used as the screen SC, or the like. Depending on the placement state of the projector 10, the placement state may not be suitable for the use of the light emission device 60. For example, when the projector 10 and the light emission device 60 are placed below the screen SC and projection is performed on the screen SC from below, the body of the user blocks the emitted light of the light emission device 60 in some cases, which is not suitable. The attitude sensor 47 is provided in the main body of the projector 10 so as to be capable of identifying a plurality of placement states considered as the placement state of the projector 10. The attitude sensor 47 is configured using, for example, a two-axis gyro sensor, a single-axis gyro sensor, an acceleration sensor, or the like. The control unit 30 can automatically determine the placement state of the projector 10 based on the output value of the attitude sensor 47. When the control unit 30 determines that the placement state is not suitable for the use of the light emission device 60, the emission device driving unit 48 stops the output of the power supply voltage or pulse signal, for example.

The control unit 30 reads and executes the control program 111 stored in the storage unit 110 to thereby realize the functions of a projection control unit 31, a detection control unit 32, an emission control unit 33, and a calibration control unit 34 and control each part of the projector 10.

The projection control unit 31 acquires, based on operation data that is input from the operation detecting unit 17, the content of an operation performed by the user. The projection control unit 31 controls, according to the operation performed by the user, the image processing unit 40, the light source driving unit 45, and the light modulator driving unit 46 to project an image onto the screen SC. The projection control unit 31 controls the image processing unit 40 to execute the process for determining whether an image is a 3D (three-dimensional) image or a 2D (two-dimensional) image, the resolution converting process, the frame-rate converting process, the distortion correcting process, the digital zoom process, the color-tone correcting process, the luminance correcting process, and the like, as described above. Moreover, the projection control unit 31 controls, in conjunction with the process of the image processing unit 40, the light source driving unit 45 to control the light intensity of the light source unit 21.

Moreover, the projection control unit 31 corrects the coordinate values of the pointed position detected by the position detecting unit 50 using the first reference variation amounts 115 or the second reference variation amounts 116 stored in the storage unit 110.

The detection control unit 32 controls the position detecting unit 50 to execute the detection of the pointed position of the pointer 70 or 80. The detection control unit acquires, from the position detecting unit 50, the coordinate values of the pointed position and the type information indicating the type of the pointer 70 or 80 used by the user for an operation instruction. Moreover, when the operation instruction is performed by the pointer 70, the detection control unit 32 acquires the data indicating the operating state of the operation switch 75 from the position detecting unit 50. The detection control unit 32 executes a correcting process for correcting the coordinate values using the acquired coordinate values and type information. Moreover, the detection control unit 32 executes a previously set process based on the coordinate values corrected by the correcting process and the data indicating the operating state of the operation switch 75. For example, the image processing unit 40 performs a process to draw a figure based on the acquired coordinates, superimpose the drawn figure on the input image that is input to the image I/F unit 12, and project the superimposed image. The detection control unit 32 may output the acquired coordinates to the external device such as a PC connected to the I/F unit 11. In this case, the detection control unit 32 may convert the acquired coordinates into those in a data format recognized as an input of a coordinate input device in an operating system of the external device connected to the I/F unit 11, and output the data. For example, when a PC that operates on a Windows (registered trademark) operating system is connected to the I/F unit 11, data to be processed as input data of an HID (Human Interface Device) in the operating system is output. Moreover, the detection control unit 32 may output, together with the coordinate data, data for distinguishing between the operation position of the pointer 70 and the operation position of the pointer 80, and the data indicating the operating state of the operation switch 75.

Moreover, the detection control unit 32 controls the detection of a position at which the pointer 80 is used. Specifically, the detection control unit 32 determines based on the presence or absence of connection of the light emission device 60 whether or not the light emission device 60 can be used. If the light emission device 60 cannot be used, the detection control unit 32 performs setting so as not to allow the use of the light emission device 60. Here, the detection control unit 32 may inform the user that the light emission device 60 cannot be used.

The emission control unit 33 controls the emission device driving unit 48 to execute or stop the output of power and pulse signal to the light emission device 60 connected to the connecting unit 49. When the light emission device 60 cannot be used or is not used under the control of the detection control unit 32, the emission control unit 33 stops the output of power and pulse signal of the emission device driving unit 48. When the light emission device 60 is to be used, the emission control unit 33 causes the emission device driving unit 48 to output power and a pulse signal.

The calibration control unit 34 executes calibration. The calibration is a process for associating the position in the projection image projected onto the screen SC with the position in the captured image data captured by the imaging unit 51. The calibration control unit 34 can execute auto-calibration and manual calibration as calibration regarding the pointed position of the pointer 70 or 80. The auto-calibration is a process in which an image for auto-calibration is projected onto the screen SC, the image is captured by the imaging unit 51, and the first calibration data 117 is generated using the captured image data. A plurality of marks are displayed in the image for auto-calibration. The calibration control unit 34 associates marks detected from the captured image data with marks in the projected image drawn in the frame memory 44, that is, the marks of the image for auto-calibration to generate the first calibration data 117.

Moreover, when the calibration control unit 34 executes the manual calibration, the calibration control unit 34 projects an image for manual calibration onto the screen SC. A plurality of marks are displayed also in the image for manual calibration. The calibration control unit 34 detects an operation of the pointer 70 or 80 on the projected image to generate the second calibration data 118. That is, the calibration control unit 34 associates the coordinate values of the pointed position detected in the captured image data with the coordinate values of the mark on the projection image to thereby generate the second calibration data 118.

Figure 3:
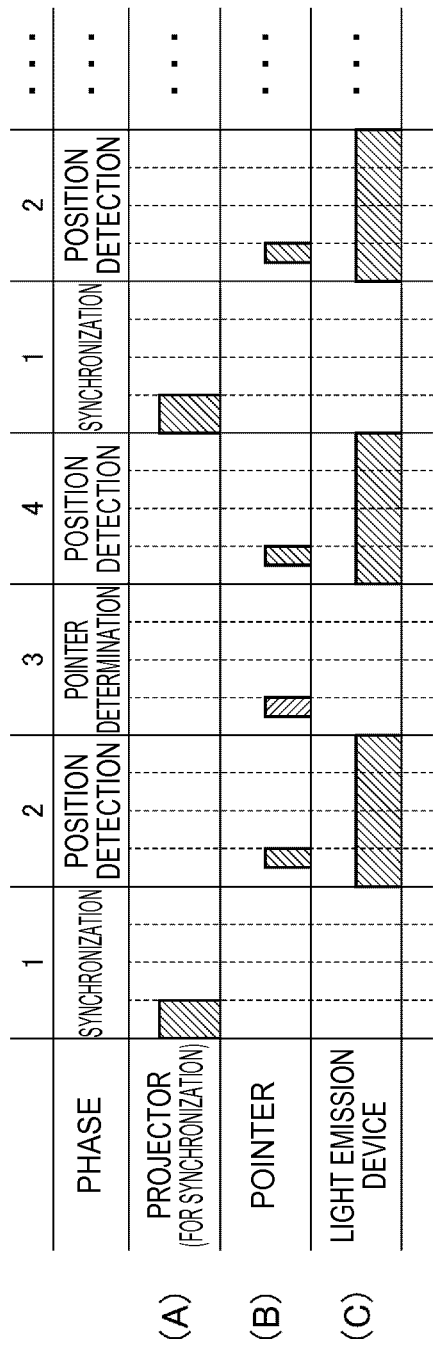
FIG. 3 is a sequence diagram showing light emitting timing of each part.

Here, the method for determining the pointer 70 or 80, which is performed by the pointer detecting unit 54, will be described with reference to FIG. 3.

The projection system 1 of the embodiment captures at least one of an image of light emitted by the pointer 70 and an image of reflected light that is light output by the light emission device 60 and reflected by the pointer 80 with the imaging unit 51 to specify the pointed position of the pointer 70 or 80. For distinguishing between the image of light emitted by the pointer 70 and the image of light reflected by the pointer 80, the projection system of the embodiment causes the pointer 70 and the light emission device 60 to be turned on in a predetermined light emission sequence. The light emission sequence of the projection system 1 of the embodiment is composed of four phases from the first to fourth phases, and the first to fourth phases are repeated in order. In the embodiment, the lengths of the first to fourth phases are set to be the same time. Moreover, the time for one light emission of the transmitting unit 52 is set to ¼ of one phase; the time for one light emission of the pointer 70 is set to ⅛ of one phase; and the time for one light emission of the light emission device 60 is set to one phase. However, these are illustrative only.

The first phase is a synchronization phase. In the first phase, the transmitting unit 52 of the projector 10 transmits a synchronizing infrared ray signal by emitting light. The control unit 73 of the pointer 70 detects the synchronizing infrared ray signal with the transmitting and receiving unit 74, and recognizes the start timing of the first phase.

The second phase is a position detection phase, in which the light source unit 61 of the light emission device 60 and the transmitting and receiving unit 74 of the pointer 70 are turned on. The projector 10 captures an image of a capture range with the imaging unit 51 in synchronization with the light emitting timings of the light emission device 60 and the pointer 70. For example, when the imaging unit 51 captures an image at the light emitting timing of the pointer 70 in the second phase, the light emission of the pointer 70 and detection light reflected by the pointer 80 appear in the captured image. Moreover, when the imaging unit 51 captures an image at the non-light emitting timing of the pointer 70, the reflected light of the pointer 80 appears in the captured image.

The capture timing and capture interval of the imaging unit 51 are previously set, and the number of times of capture per phase may be one or more. When the pointer 70 emits light once per phase as shown in FIG. 3, it is desirable to capture an image at at least the light emitting timing of the pointer 70 in each phase. Moreover, any method is adopted as a method for adjusting the capture timing of the imaging unit 51 and the light emitting timing of each part. In general, it is not easy in many cases to make the capture timing and capture interval of the imaging unit 51 variable, and therefore, the emission control unit 33 may adjust the light emitting timing of the transmitting unit 52 in consideration of the capture timing of the imaging unit 51.

The third phase is a pointer determination phase. In the third phase, while the pointer 70 emits light, the light emission device 60 does not emit light. For this reason, in the captured image captured by the imaging unit 51 in the third phase, an image of light emitted by the pointer 70 appears, but the reflected light of the pointer 80 does not appear.

The fourth phase is a position detection phase, similarly to the second phase, in which the light source unit 61 of the light emission device 60 and the transmitting and receiving unit 74 of the pointer 70 are turned on.

Accordingly, by comparing the captured image in the third phase with the captured images in the second phase and the fourth phase, the detection control unit 32 can distinguish whether the image of light appearing in each of the captured images in the second phase and the fourth phase is the image of light of the pointer 70 or the image of the reflected light of the pointer 80. When the time for each of the phases is sufficiently short, the positions of the images appearing in the captured images in the successive second, third, and fourth phases are close to each other. For this reason, it is easy to distinguish between the light of the pointer 70 and the reflected light of the pointer 80.

Further, when a plurality of pointers 70 are used in the projection system 1, it is also possible to distinguish the light emissions of the respective pointers 70 in the captured image of the imaging unit 51. That is, light emitting timing that is different from pointer to pointer is previously set for each of the pointers 70. Specifically, whether or not the pointer emits light in the third phase is set for each of the pointers 70. For example, for a first pointer 70, the light emission or non-light emission in the third phase during the execution of the first to fourth phases four times is set to "1000" (1 indicates light emission while 0 indicating non-light emission). For a second pointer 70, the light emission or non-light emission in the third phase during the execution of the first to fourth phases four times is set to "1010". In this case, by comparing four captured images in the third phases captured during the execution of the first to fourth phases four times, it is possible to distinguish between the first pointer 70 and the second pointer 70.

Figure 4A:
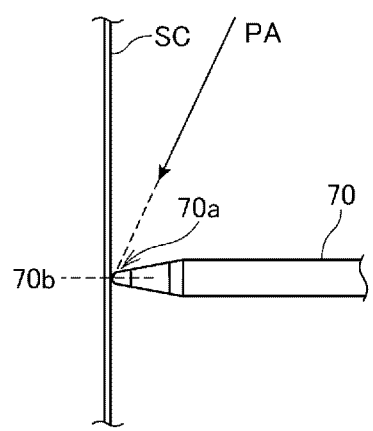
FIGS. 4A and 4B are explanatory views showing the state of detecting a pointed position of a pointer.
Figure 4B:
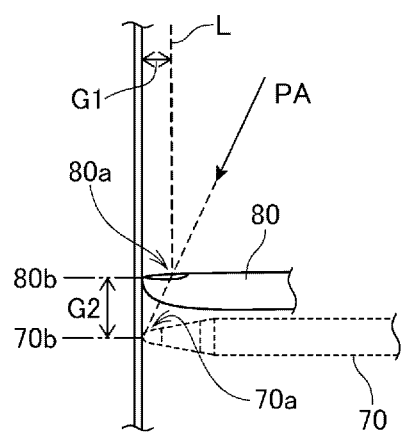

Next, a method for detecting the pointed position of the pointer 70 or 80 will be described with reference to FIGS. 4A and 4B. FIG. 4A shows the state of detecting the pointed position of the pointer 70. FIG. 4B shows the state of detecting the pointed position of the pointer 80.

Sign PA represents a capture direction in which the imaging unit 51 captures an image of the screen SC. When the position detection of the pointer 70 is performed, the transmitting and receiving unit 74 emits infrared light from a light emitting position 70a of the tip of the pointer 70. The light emitting position 70a is very close to a touch point 70b at which the pointer 70 touches the screen SC. For this reason, when an image of light emitted by the pointer 70 is detected from captured image data captured from the capture direction PA, the position of the image can be deemed as the position of the touch point 70b.

In contrast, when the pointed position of the pointer 80 is detected as shown in FIG. 4B, reflected light of detection light L reflected by the pointer 80 is detected. That is, an image of the reflected light of the detection light L is detected from captured image data captured from the capture direction PA. The emitted direction of the detection light L is substantially parallel to the screen SC. The detection light L is away from the screen SC by a predetermined distance (hereinafter referred to as a distance G1). The distance G1 varies depending on the attached position of the light emission device 60 to the screen SC, and it is structurally difficult to make the distance G1 zero. For this reason, an image of reflected light reflected at a reflected position 80a away from the screen SC by the distance G1 appears at the tip of the pointer in the captured image data captured from the capture direction PA. As shown in FIG. 4B, the reflected position 80a is away in an oblique direction relative to the capture direction PA. For this reason, the position of the image of the reflected light appearing in the captured image data is the same as the position of an image obtained when a more distant position is pointed to by the pointer 70 in the capture direction PA. That is, the reflected light obtained when the pointer 80 touches the screen SC at a touch point 80b and the light obtained when the pointer 70 touches the screen SC at the touch point 70b appear at the same position in the captured image data of the imaging unit 51. For this reason, the touch point 80b pointed to by the pointer 80 is detected as the touch point 70b that is away from the imaging unit 51 in the capture direction PA, which causes a deviation of the distance G2.

The deviation of the distance G2 is caused by the imaging unit 51 obliquely capturing an image from the position that is away from the screen SC. For example, the positional relationship between the capture direction PA and the pointers 70 and 80 shown in FIGS. 4A and 4B is generated not only in the vertical direction but also in the horizontal direction similarly. In the embodiment, one imaging unit 51 that is provided in the main body of the projector 10 located above the screen SC looks down upon the screen SC and captures an image thereof as shown in FIG. 1, and therefore, the deviation of the distance G2 is generated in both the vertical and horizontal directions.

Figure 5:
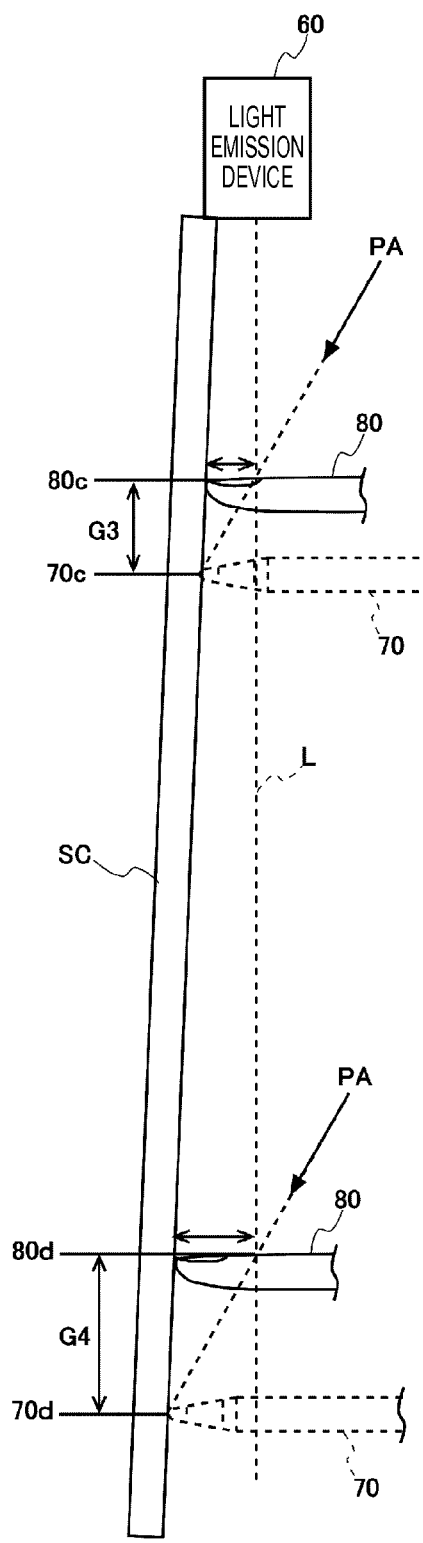
FIG. 5 is a diagram showing the state of detecting a pointed position on an inclined screen.

Moreover, when the screen SC is placed inclined to the vertical direction as shown in FIG. 5, a distance between the screen SC and the detection light L emitted by the light emission device 60 varies according to a distance from the light emission device 60. That is, since the detection light L as infrared light has high rectilinearity, the distance between the detection light L and the screen SC may vary depending on the pointed position when the screen SC is placed in an inclined manner. For this reason, depending on the position on the screen SC pointed to by the pointer 80, an error in the pointed position detected from the captured image data of the imaging unit 51 varies.

For example, when a position 80c on the screen SC is pointed to in FIG. 5, the position 80c is detected as a position 70c that is away from the imaging unit 51 in the capture direction PA, which causes a deviation of a distance G3. Moreover, when a position 80d on the screen SC is pointed to, the position 80d is detected as a position 70d that is away from the imaging unit 51 in the capture direction PA, which causes a deviation of a distance G4. As shown in FIG. 5, when the distance between the detection light L and the screen SC increases with increasing distance from the light emission device 60, the error in the pointed position detected from the captured image data of the imaging unit 51 increases as the position on the screen SC pointed to by the user is away from the light emission device 60, as apparent from comparison between the distance G3 and the distance G4.

Moreover, even when the screen SC is not placed inclined to the vertical direction, the screen SC is pressed by the pointer 70 or 80, and therefore, the imaging unit 51 may capture an image of the screen SC in the state of being inclined to the vertical direction. In such a case, similarly to the case where the screen SC is placed inclined to the vertical direction, an error is generated between the position on the screen SC pointed to by the pointer 70 or 80 and the pointed position detected from the captured image data of the imaging unit 51. That is, the pointed position detected from captured image data of the imaging unit 51 varies.

Moreover, a deviation may be generated in the pointed position to be detected also depending on the user's operation characteristics or the capture timing of the imaging unit 51.

Figure 6A:
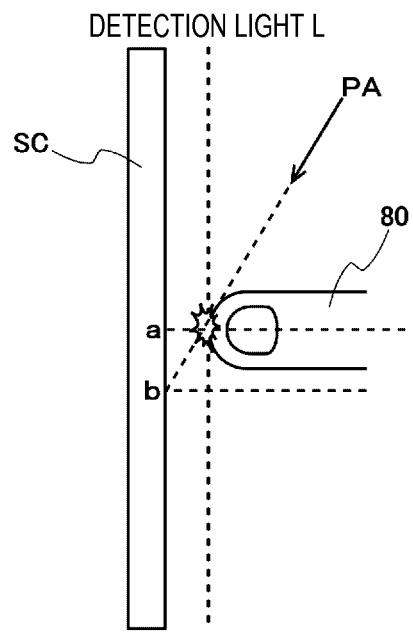
FIGS. 6A and 6B are diagrams showing a difference between detected positions due to a difference between pointed positions.
Figure 6B:
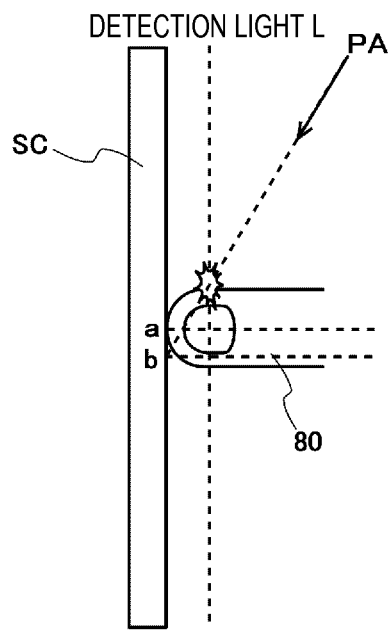

For example, the position at which the detection light L shines on the pointer 80 varies between the case where a pointed position is pointed to by the pointer 80 without touching the screen SC (refer to FIG. 6A) and the case where a pointed position is pointed to by the pointer 80 by touching the screen SC (refer to FIG. 6B). For this reason, a deviation is also generated in the pointed position detected from the captured image data of the imaging unit 51. A position a shown in FIGS. 6A and 6B represents a position actually pointed to on the screen SC by the user with the pointer 80, while a position b represents a position on the screen SC detected from the captured image data of the imaging unit 51.

Moreover, a similar situation occurs also depending on the capture timing of the imaging unit 51. For example, a deviation is generated in the pointed position to be detected between the case where the capture timing of the imaging unit 51 is the timing at which the pointer 80 does not touch the screen SC as shown in FIG. 6A and the case where the capture timing is the timing at which the pointer 80 touches the screen SC as shown in FIG. 6B.

Figure 7A:
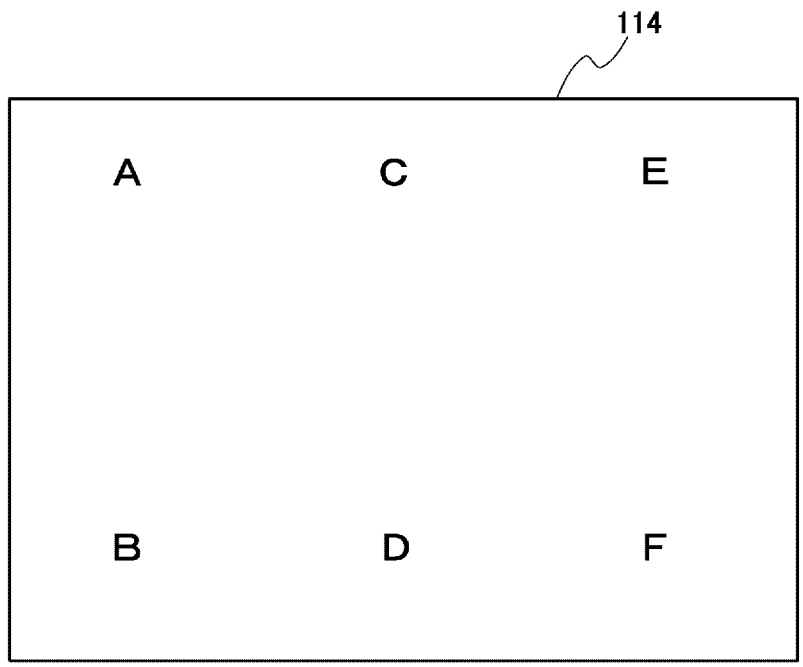
FIG. 7A is a diagram showing an example of a reference variation amount calculation image.

For correcting the variations in the pointed position, the projector 10 projects, for example, the reference variation amount calculation image 114 shown in FIG. 7A onto the screen SC, and calculates reference variation amounts of a pointed position detected at each position on the reference variation amount calculation image 114. The reference variation amount calculation image 114 is an image in which a plurality of predetermined marks (characters A to F in the embodiment) are displayed. By displaying the reference variation amount calculation image 114 on the screen SC, the control unit 30 causes the user to perform a pressing operation with at least one of the pointer 70 and the pointer 80 at a plurality of mark positions at which the marks are displayed.

The user inputs the pointer 70 or 80 with which pointing is performed using the operation panel 19, and then, the user presses each of the mark positions at which the marks are displayed with the selected pointer 70 or 80 for, for example, two seconds. An image of the pressing operation of the user is captured a plurality of times for each of the mark positions by the imaging unit 51. When the pointer 70 is selected, the position detecting unit 50 calculates the coordinate values of the position at which the pointer 70 emits light in each of the captured images captured by the imaging unit 51. When the pointer 80 is selected, the position detecting unit 50 calculates the coordinate values of the position of reflected light reflected by the pointer 80 in each of the captured images captured by the imaging unit 51. The position detecting unit 50 outputs the plurality of coordinate values calculated for each of the mark positions to the control unit 30. Using the type information of the pointer 70 or 80 input by the user and the plurality of coordinate values acquired for each of the mark positions, the detection control unit 32 of the control unit 30 calculates the reference variation amounts of the coordinate values at each of the mark positions. The reference variation amounts are separately generated for each of the pointer 70 and the pointer 80. The reference variation amounts at the mark position are obtained by, for example, respectively comparing X-coordinate values and Y-coordinate values of the coordinate values calculated from the captured image data captured the plurality of times. For example, the detection control unit 32 obtains the maximum and minimum values of X-coordinate values and the maximum and minimum values of Y-coordinate values of the plurality of coordinate values detected at the same mark position. The X-coordinate and the Y-coordinate are coordinate values of the pointed position of the pointer 70 or 80 in the captured image data, which are calculated by the coordinate calculating unit 55. However, the X-coordinate and the Y-coordinate may be coordinate values of the pointed position in a projected image. Moreover, the X-coordinate and the Y-coordinate may be coordinate values of the pointed position in image data drawn in the frame memory 44. The detection control unit 32 calculates a difference between the obtained maximum and minimum values of the X-coordinate values and a difference between the obtained maximum and minimum values of the Y-coordinate values as the reference variation amounts at the mark position.

Figure 7B:
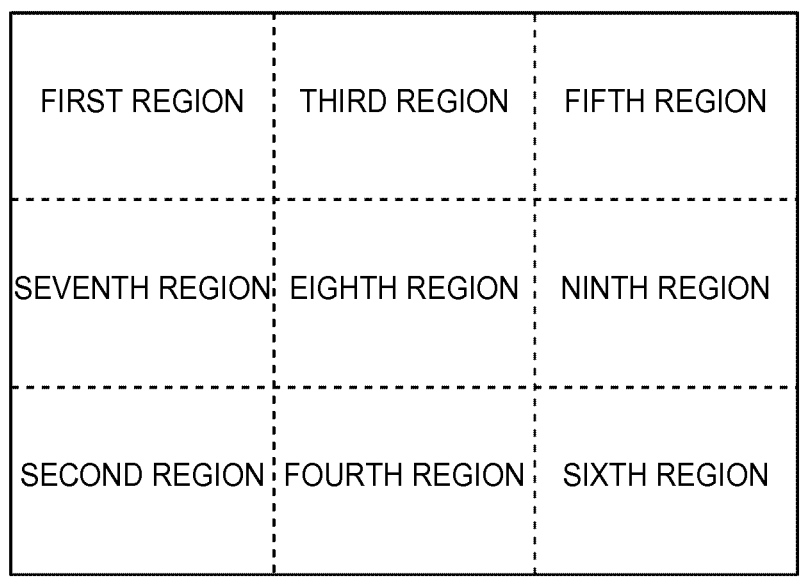
FIG. 7B is a diagram showing the state of captured image data divided into regions.

Moreover, when the reference variation amounts are calculated, the detection control unit 32 causes the storage unit 110 to store the calculated reference variation amounts. When the pointer 70 is selected, the detection control unit 32 causes the storage unit 110 to store the detected reference variation amounts of the pointer 70 as the first reference variation amounts 115. When the pointer 80 is selected, the detection control unit 32 causes the storage unit 110 to store the reference variation amounts of the pointer 80 as the second reference variation amounts 116. Further, the detection control unit 32 causes the storage unit 110 to store the calculated reference variation amounts at each of the mark positions as reference variation amounts of a region including the mark. For example, in the reference variation amount calculation image 114 shown in FIG. 7A, reference variation amounts at six points from A to F are obtained. The detection control unit 32 divides captured image data into, for example, nine regions as shown in FIG. 7B, and causes the storage unit 110 to store reference variation amounts of the mark included in each of the divided nine regions as reference variation amounts of the corresponding region. For example, the detection control unit 32 causes the storage unit 110 to store reference variation amounts of the mark position A shown in FIG. 7A as reference variation amounts of a first region shown in FIG. 7B. Similarly, the detection control unit 32 causes the storage unit 110 to store reference variation amounts of the mark positions B, C, D, E, and F shown in FIG. 7A as reference variation amounts of the second, third, fourth, fifth, and sixth regions, respectively, shown in FIG. 7B.

Moreover, the detection control unit 32 obtains reference variation amounts of a region of the captured image data where a mark does not exist by an interpolation process using reference variation amounts of regions close to the above-described region. For example, in the example shown in FIG. 7B, a mark is not included in the seventh, eighth, ninth regions as the central region of the captured image data. For this reason, the detection control unit 32 obtains the average values of the reference variation amounts of the first region and the second region that are the regions close to the seventh region, and causes the storage unit 110 to store the obtained average values as reference variation amounts of the seventh region. Moreover, the detection control unit 32 similarly obtains reference variation amounts of the eighth region and the ninth region, and causes the storage unit 110 to store the obtained reference variation amounts.

Figure 8:
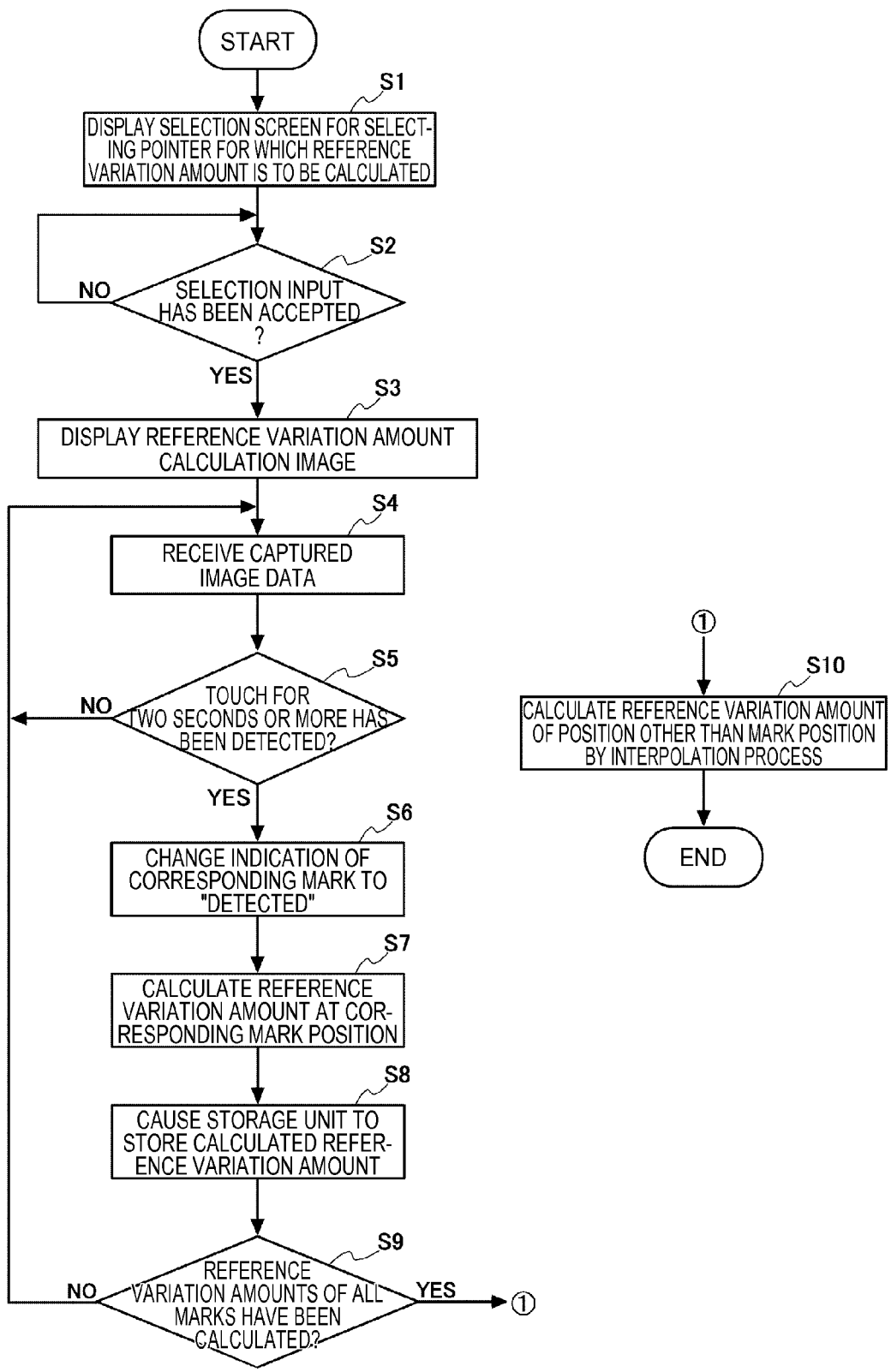
FIG. 8 is a flowchart showing a procedure to calculate a reference variation amount.

Next, a procedure to calculate a reference variation amount will be described with reference to a flowchart shown in FIG. 8. The process may be executed together with the manual calibration performed by the calibration control unit 34, or may be performed after executing the manual calibration or the auto-calibration.

First, the projection control unit 31 of the control unit 30 causes the display unit 16 to display a selection screen for selecting the pointer 70 or 80 for which a reference variation amount is to be calculated (Step S1). If the selection input of the pointer 70 or 80 has been accepted through the operation panel 19, or an operation input of the remote control has been received with the remote control light receiving unit 18 (YES in Step S2), the projection control unit 31 projects the reference variation amount calculation image 114 onto the screen SC (Step S3). In the reference variation amount calculation image 114, the plurality of marks for designating positions to be pointed to by the pointer 70 or are displayed. When the reference variation amount calculation image 114 is projected onto the screen SC, the detection control unit 32 of the control unit 30 outputs an instruction to the capture control unit 53 to start capturing an image.

The capture control unit 53 of the position detecting unit 50 causes the imaging unit 51 to capture an image of a detection region as a region including the screen SC, and receives captured image data captured by the imaging unit 51 (Step S4). The capture control unit 53 sends the received captured image data to the pointer detecting unit 54. The pointer detecting unit 54 detects an image of infrared light emitted by the pointer 70 or an image of reflected light reflected by the pointer 80 from the captured image data captured by the capture control unit 53. The coordinate calculating unit 55 calculates, based on the position of the image detected by the pointer detecting unit 54, the coordinate values of the pointed position of the pointer 70 or 80 in the captured image data, and outputs the calculated coordinate values to the control unit 30. Moreover, when the image of infrared light emitted by the pointer 70 or the image of reflected light reflected by the pointer 80 cannot be detected from the captured image data, the pointer detecting unit 54 informs the coordinate calculating unit 55 of error notification. The coordinate calculating unit 55 outputs the error notification received from the pointer detecting unit 54 to the control unit 30.

If coordinate values have been successively received predetermined times from the coordinate calculating unit 55, the detection control unit 32 of the control unit 30 determines that touch for two seconds or more has been detected (YES in Step S5), and changes the indication of the corresponding mark to "detected" (Step S6). When coordinate values cannot be successively received predetermined times such as the case of receiving the error notification from the position detecting unit 50, the detection control unit 32 outputs an instruction to the capture control unit 53 to start capturing an image.

Next, the detection control unit 32 calculates reference variation amounts at the mark position whose coordinate values are received (Step S7). For example, the detection control unit 32 obtains the maximum and minimum values of X-coordinates and the maximum and minimum values of Y-coordinates of the coordinate values successively received predetermined times from the coordinate calculating unit 55, and calculates differences between the obtained maximum and minimum values as reference variation amounts at the corresponding mark position. When the reference variation amount of the coordinate value is ±5 pixels, it may be determined that a variation is not generated in the coordinate value. When the reference variation amounts at the corresponding mark position are calculated, the detection control unit 32 causes the storage unit 110 to store the calculated reference variation amounts at the mark position in association with the type information of the pointer 70 or for which the reference variation amounts have been calculated (Step S8). The detection control unit 32 causes the storage unit 110 to store the calculated reference variation amounts at the mark position as reference variation amounts of the region including the mark. For example, in the case of the reference variation amounts at the mark position A shown in FIG. 7A, the detection control unit 32 causes the storage unit 110 to store the reference variation amounts as reference variation amounts of the first region shown in FIG. 7B.

Next, the detection control unit 32 determines whether or not reference variation amounts have been calculated at all of the mark positions (Step S9). If it is determined that the reference variation amounts at all of the mark positions have not been calculated (NO in Step S9), the detection control unit 32 returns to Step S4, and outputs an instruction to the capture control unit 53 to start capturing an image. If it is determined that the reference variation amounts at all of the mark positions have been calculated (YES in Step S9), the detection control unit 32 calculates reference variation amounts of a region other than the regions including the marks by an interpolation process (Step S10). The detection control unit 32 causes the storage unit 110 to store the calculated reference variation amounts.

Figure 9:
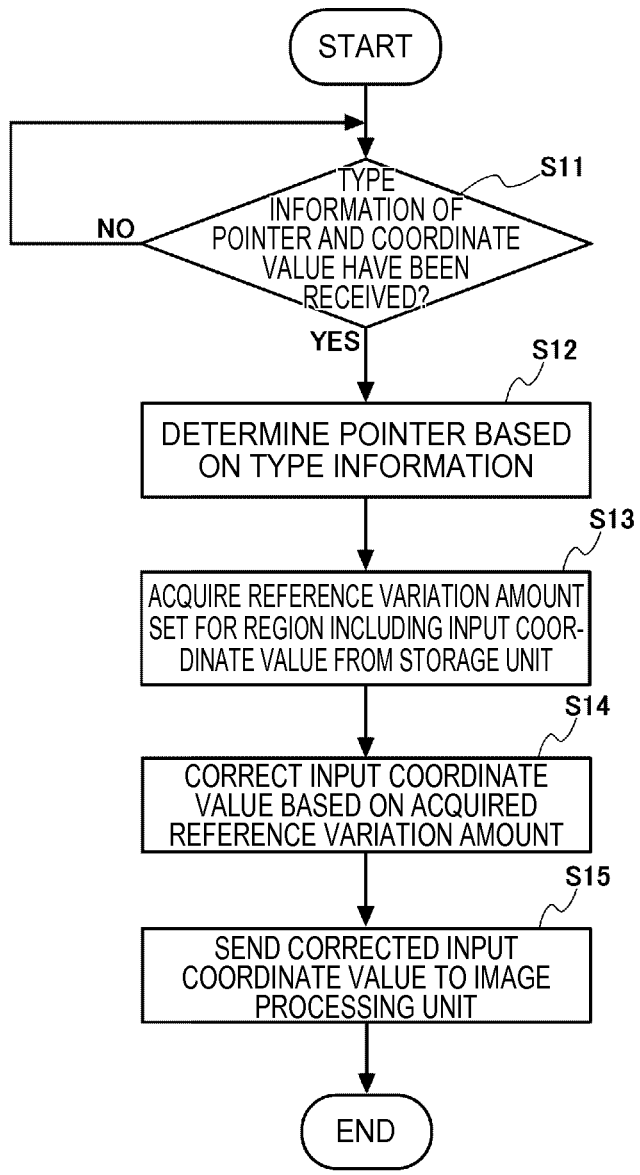
FIG. 9 is a flowchart showing a procedure to correct a pointed position using a reference variation amount.

Next, a process for correcting a coordinate value pointed to by the pointer 70 or 80 will be described in detail with reference to a flowchart shown in FIG. 9.

For example, when an image based on image data that is input via the image I/F unit 12 is projected onto the screen SC, the capture control unit 53 causes the imaging unit 51 to capture an image of a detection region under the control of the control unit 30. The position detecting unit 50 detects an image of infrared light emitted by the pointer 70 or an image of reflected light reflected by the pointer 80 from the captured image data captured by the imaging unit 51, and calculates the coordinate value of the pointed position by the pointer 70 or 80. Moreover, the position detecting unit 50 determines based on the light emitting timings of the pointer 70 and the light emission device 60 whether the detected image is the image of infrared light emitted by the pointer 70 or the image of reflected light reflected by the pointer 80. The position detecting unit 50 outputs the detected coordinate value and type information indicating the type of the used pointer 70 or 80 to the control unit 30.

First, the projection control unit 31 determines whether or not the coordinate value (hereinafter referred to as an input coordinate value) and the type information of the pointer 70 or 80 used for an operation have been received from the position detecting unit 50 (Step S11). If the type information and the input coordinate value have been received (YES in Step S11), the projection control unit 31 determines based on the type information whether the operation instruction was performed by the pointer 70 or the pointer 80 (Step S12). If it is determined that the operation was performed by the pointer 70, the projection control unit 31 acquires, from the storage unit 110, the first reference variation amount that is set for the region including the input coordinate value (Step S13). Moreover, if it is determined that the operation was performed by the pointer 80, the projection control unit 31 of the control unit 30 acquires, from the storage unit 110, the second reference variation amount that is set for the region including the input coordinate value (Step S13). When the first reference variation amount or the second reference variation amount is acquired, the projection control unit 31 corrects the input coordinate value received from the position detecting unit 50 using the acquired reference variation amount (Step S14). The projection control unit 31 sends the corrected input coordinate value to the image processing unit 40 (Step S15). For example, the projection control unit 31 calculates a difference between a previous input coordinate value and a present input coordinate value. Then, the projection control unit 31 determines whether the calculated difference between the coordinate values falls within the range of the first reference variation amount or the second reference variation amount acquired from the storage unit 110. If the calculated difference between the coordinate values falls within the range of the acquired first or second reference variation amount, the projection control unit 31 determines that there is no change (variation) in the coordinate value, and sends the previous input coordinate value as it is to the image processing unit 40. In other words, the projection control unit 31 performs a correction (correction for making a change zero) for compensating a change from the previous input coordinate value on the present input coordinate value, and sends the coordinate value to the image processing unit 40. If the calculated difference between the coordinate values does not fall within the range of the acquired first or second reference variation amount, the projection control unit 31 determines that there is a change in the coordinate value, and sends the present input coordinate value to the image processing unit 40. The image processing unit 40 draws a figure based on the coordinates value acquired from the projection control unit 31, superimposes the drawn figure on an input image that is input to the image I/F unit 12, and projects the superimposed image.

In the embodiment as has been described above, when the image of the pointer 70 or 80 is detected from the captured image data of the imaging unit 51, the pointer detecting unit 54 determines whether the pointer used for an operation is the pointer 70 or the pointer 80. Then, the type of the pointer 70 or 80 determined by the pointer detecting unit 54 and the reference variation amounts according to the pointed position are acquired from the storage unit 110, and the pointed position detected by the coordinate calculating unit 55 is corrected by the projection control unit 31. Accordingly, proper pointing can be detected irrespective of the pointer 70 or 80 used. For this reason, it is possible to suppress a reduction in responsiveness of operation such as touch, release, or drag using the pointer 70 or 80.

The projector 10 of the embodiment to which the invention is applied includes the pointer detecting unit 54, the coordinate calculating unit 55, the storage unit 110, and the projection control unit 31. The pointer detecting unit 54 determines the type of the pointer 70 or 80. The coordinate calculating unit 55 detects the pointed position of the pointer 70 or 80. The storage unit 110 stores the reference variation amounts of the pointed position by the pointer 70 or 80 for each of the pointers 70 and 80. The projection control unit 31 acquires, from the storage unit 110, the reference variation amounts according to the type of the pointer 70 or 80 determined by the pointer detecting unit 54, and corrects the pointed position detected by the coordinate calculating unit 55. Accordingly, the correction of the pointed position can be properly performed irrespective of the pointer 70 or 80 used.

Moreover, when a variation in the pointed position falls within the reference variation amount, the projection control unit 31 performs a correction for compensating the variation. That is, the projection control unit 31 performs a correction (correction for making the change zero) for compensating the change from the previous input coordinate value. For this reason, it is possible to detect the absence of variation in the pointed position.

Moreover, the detection control unit 32 calculates a reference variation amount based on a variation in the pointed position detected by the pointer detecting unit 54, and causes the storage unit 110 to store the calculated reference variation amount. Accordingly, it is possible to calculate the reference variation amount based on the variation in the pointed position detected by the pointer detecting unit 54 and cause the storage unit to store the calculated reference variation amount.

Moreover, the projector 10 includes the light emission device 60 and the imaging unit 51. The light emission device 60 emits detection light to the detection region in which the pointed position of the pointer 70 or 80 is detected. The imaging unit 51 captures an image of the detection region. The pointer detecting unit 54 detects at least one of an image of light emitted by the pointer 70 and an image of the detection light reflected by the pointer 80 from the captured image data of the imaging unit 51. Then, the pointer detecting unit 54 detects the pointed position while distinguishing between the pointer 70 and the pointer 80 based on the light emitting timings of the pointer 70 and the light emission device 60. Accordingly, the correction of the pointed position can be properly performed irrespective of the pointer 70 or 80 used.

Moreover, the pointer detecting unit 54 detects, as the pointed position of the pointer 70, the position of a bright spot appearing in the captured image data obtained when the light emission device 60 is turned off. Accordingly, it is possible to improve the accuracy of distinguishing between the pointer 70 and the pointer 80.

Moreover, when correcting the pointed position, the projection control unit 31 uses the reference variation amount different according to the pointed position. Accordingly, the correction of the pointed position can be performed using the reference variation amount according to the pointed position of the pointer 70 or 80. For this reason, the accuracy of position detection can be improved irrespective of the pointed position.

Moreover, a plurality of reference variation amounts according to pointed positions are stored in the storage unit 110. The projection control unit 31 acquires, from the storage unit 110, the reference variation amount according to the pointed position detected by the coordinate calculating unit 55, and corrects the pointed position detected by the coordinate calculating unit 55. Accordingly, the pointed position can be corrected using the reference variation amount that is proper for each of the pointed positions of the pointer 70 or 80.

Moreover, the projection control unit 31 adjusts the reference variation amount stored in the storage unit 110 according to the pointed position, and corrects the pointed position detected by the pointer detecting unit 54 based on the adjusted reference variation amount. Accordingly, the correction accuracy of the pointed position can be increased.

Moreover, the detection control unit 32 divides the detection region in which the pointed position of the pointer 70 or 80 is detected into a plurality of regions, and calculates a reference variation amount for each of the divided regions. The projection control unit 31 corrects the pointed position based on the reference variation amount of a region including the pointed position detected by the coordinate calculating unit 55 in the plurality of regions. Accordingly, since the reference variation amount is calculated for each of the plurality of regions, the accuracy of position detection can be improved.

Moreover, the detection control unit 32 calculates, for some of the divided regions, reference variation amounts based on variations in the pointed positions detected by the coordinate calculating unit 55, and calculates, for the other regions, reference variation amounts by an arithmetic process using the reference variation amounts of some regions. Accordingly, the number of regions for which reference variation amounts are to be calculated can be reduced to thereby shorten the time for calculating reference variation amounts.

The embodiment described above is only an example of a specific aspect to which the invention is applied, and does not limit the invention. The invention can be applied to a different aspect. For example, in the embodiment, the reference variation amounts are previously stored in the storage unit 110 for each of the pointers 70 and 80 and each of the regions, and when a coordinate value is corrected, the reference variation amount according to the pointer 70 or 80 and the region is acquired. However, the invention is not limited to this aspect. For example, it is also possible to adopt the following aspect. One reference variation amount is previously stored for each of the pointers 70 and 80, and an adjustment amount (for example, a difference from the reference variation amount) is stored for each of the regions. Then, when a coordinate value is corrected, the reference variation amount acquired according to the pointer 70 or 80 is adjusted using the adjustment amount according to the region, and the coordinate value is corrected using the adjusted reference variation amount.

Moreover, in the embodiment, when a reference variation amount is calculated, a difference between the maximum and minimum values of coordinate values is used as the reference variation amount. However, the invention is not limited thereto. For example, a value obtained by adding a predetermined value to the difference between the maximum and minimum values of coordinate values maybe used as the reference variation amount.

Moreover, in the embodiment, when a reference variation amount is calculated, the pointer 70 or 80 touches each of the marks on the reference variation amount calculation image 114 for a predetermined setting time (two seconds) or more. However, the setting time is not limited to two seconds, and may be two seconds or less, or two seconds or more.

Moreover, in the embodiment, an aspect has been described in which the user performs a pointing operation with the pointer 70 or 80 on the screen SC onto which an image is projected (displayed) from the projector 10 of a front projection type. In addition to this aspect, an aspect may be adopted in which a pointing operation is performed on a display screen that is displayed by a display device other than the projector 10. As the display device other than the projector 10, a rear projection type projector, a liquid crystal display, an organic EL (Electro Luminescence) display, or the like can be used. Moreover, a plasma display, a CRT (cathode-ray tube) display, an SED (Surface-conduction Electron-emitter Display), or the like can be used as the display device.

Moreover, as the pointer 70, a pointer 70 that is set so as not to emit light may be used. The pointer is not limited to the pen-type pointer 70 or the pointer 80 as the user's finger. A laser pointer, a pointing rod, or the like may be used, and the shape or size thereof is not limited. Moreover, the marks in the reference variation amount calculation image 114 are not limited to the characters shown in FIG. 7A, and may be other characters or figures.

Moreover, in the embodiment, a configuration has been exemplified, in which the light emission device 60 is configured as a separate body from the main body of the projector 10, and connected to the projector 10 with the cable 60a. However, the invention is not limited to the configuration. For example, the light emission device 60 may be configured to be integrally attached to the main body of the projector 10, or to be built into the main body of the projector 10. Moreover, the light emission device 60 may be supplied with power from the outside, and connected with the emission device driving unit 48 through a wireless communication line.

Moreover, in the embodiment, a configuration has been described in which a synchronizing signal is transmitted from the projector 10 to the pointer 70 using an infrared ray signal emitted by the transmitting unit 52. However, the synchronizing signal is not limited to an infrared ray signal. For example, a configuration of transmitting the synchronizing signal by radio wave communication or ultrasonic wireless communication may be adopted. The configuration can be realized by providing a transmitting unit that transmits a signal by radio wave communication or ultrasonic wireless communication in the projector 10, and providing a receiving unit, similar to the transmitting unit, in the pointer 70.

Moreover, in the embodiment, the position detecting unit 50 captures an image of the screen SC with the imaging unit 51 to specify the position of the pointer 70. However, the invention is not limited thereto. For example, the imaging unit 51 is not limited to one that is provided in the main body of the projector 10 and captures an image in the projection direction of the projection optical system 23. The imaging unit 51 may be arranged as a separate body from the main body of the projector 10, and the imaging unit 51 may capture an image from the lateral side or front of the screen SC. Further, a plurality of imaging units 51 may be arranged, and based on captured image data of the plurality of imaging units 51, the detection control unit 32 may detect the position of the pointer 70 or 80.

Moreover, in the embodiment, a configuration of using three transmissive liquid crystal panels corresponding to the respective colors of RGB has been exemplified and described as the light modulator 22 that modulates light emitted by the light source. However, the invention is not limited to the configuration. For example, a configuration of using three reflective liquid crystal panels may be used, or a method of combining one liquid crystal panel with a color wheel may be used. Alternatively, the light modulator may be configured to adopt a method of using three digital mirror devices (DMDs), a DMD method of combining one digital mirror device with a color wheel, or the like. When only one liquid crystal panel or DMD is used as the light modulator, a member corresponding to a combining optical system such as a cross dichroic prism is unnecessary. Moreover, any light modulator other than the liquid crystal panel and DMD can be adopted without problems as long as the light modulator can modulate light emitted by the light source.

Moreover, each functional part of the projection system 1 shown in FIG. 2 shows a functional configuration, and there are no particular limitations on specific embodiments. That is, it is not necessarily required to mount hardware individually corresponding to each functional part, and it is of course possible to adopt a configuration in which the functions of a plurality of functional parts are realized by executing programs with one processor. Moreover, some of the functions realized by software in the embodiment may be realized by hardware, or some of the functions realized by hardware may be realized by software. In addition, specific detailed configurations of other parts of the projection system 1 can also be changed arbitrarily within the range not departing from the scope of the invention as defined by the claims.

What is claimed is:

1. A position detecting device comprising:
    a memory that stores, for each type of two or more types of pointers, a reference variation amount; and
    a processor programmed to:
        detect a position pointed to by a pointer, the pointer pointing to the detected position being a detected pointer;
        determine a type of pointer of the detected pointer, the type of pointer of the detected pointer being one of the two or more types of pointers;
        acquire, from the memory, the reference variation amount associated with the determined type of pointer of the detected pointer; and
        correct, based on the acquired reference variation amount, the detected position.

2. The position detecting device according to claim 1, wherein the processor is further programmed to when a variation in the detected position falls within a range of the acquired reference variation amount, perform a correction that compensates for the variation in the detected position.

3. The position detecting device according to claim 1, wherein the processor is further programmed to:

calculate the reference variation amount based on a variation in the detected position, and
store, in the memory, the calculated reference variation amount.

4. The position detecting device according to claim 1, wherein the processor is further programmed to:
control a light source to emit detection light to a detection region in which the detected position of the detected pointer is located;
control a camera to capture an image of the detection region;
detect, from the captured image, at least one of light emitted by or reflected by the detected pointer; and
detect, based on light emitting timings of a light emitting pointer and the light source, the detected position while determining whether the detected pointer is the light emitting pointer or a pointer that does not emit light.

5. The position detecting device according to claim 4, wherein the processor is further programmed to: when the detected pointer is a light emitting pointer, detect, as the detected position of the detected pointer, a position of a bright spot appearing in an image that is captured when the light source is turned off.

6. The position detecting device according to claim 1, wherein when correcting the detected position, the processor uses the reference variation amount different for different detected positions.

7. The position detecting device according to claim 6, wherein the:
the memory stores, for each type of the two or more types of pointers, a plurality of reference variation amounts according to detected positions, and
the processor is further programmed to:
acquire from the memory, the reference variation amount according to the detected position, and
correct, based on the acquired reference variation amount according to the detected position, the detected position.

8. The position detecting device according to claim 6, wherein the processor is further programmed to:
adjust the reference variation amount stored in the memory according to the detected position, and
correct, based on the adjusted reference variation amount, the detected position.

9. The position detecting device according to claim 6, wherein the processor is further programmed to:
divide a detection region in which the detected position of the pointer is detected into a plurality of regions,
calculate the reference variation amount based on a variation in the detected position for each of the divided regions,
store, in the memory, the calculated reference variation amount based on the variation in the detected position for each of the divided regions, and
correct the detected position based on the reference variation amount of a region including the detected position in the plurality of regions.

10. The position detecting device according to claim 9, wherein the processor is further programmed to:
calculate, for one or more of the divided regions, the reference variation amount based on a variation in the detected position, and
calculate, for regions other than the one or more of the divided regions, the reference variation amount by an arithmetic process using the reference variation amounts of the one or more of the divided regions.

11. A position detecting method comprising:
detecting a position pointed to by a pointer, the pointer pointing to the detected position being a detected pointer;
determining a type of pointer of the detected pointer, the type of pointer of the detected pointer being one of the two or more types of pointers;
acquiring, from a memory that stores, for each type of two or more types of pointers, a reference variation amount, the reference variation amount associated with the determined type of the detected pointer; and
correcting the detected position based on the acquired reference variation amount.

* * * * *